3,257,397
SUBSTITUTED 2,3-DIHYDRO-4(1H)-
QUINAZOLINONES
James W. Bolger, Canoga Park, Calif., assignor to Rexall
Drug and Chemical Company, Los Angeles, Calif., a
corporation of Delaware
No Drawing. Filed July 26, 1963, Ser. No. 297,957
10 Claims. (Cl. 260—247.2)

This invention relates to compositions of matter classified in the art of chemistry as substituted 2,3-dihydro-4(1H)-quinazolinones and to intermediates obtained in their synthesis.

The invention sought to be patented, in its final product composition aspect, is described as residing in the concept of a chemical compound having the formula

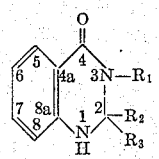

wherein $R_1$ is a 5- to 6-membered heterocyclic ring, $R_2$ is hydrogen or lower alkyl and $R_3$ is lower alkyl, phenyl, 3,4-methylenedioxyphenyl or anilino or its hereinafter described equivalents, and to the hereinafter described equivalents of such compounds.

The invention sought to be patented, in its intermediate composition aspect, is described as residing in the concept of a chemical compound having the formula

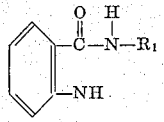

wherein $R_1$ is as described hereinabove.

As used throughout the specification and in the claims, the term "5- to 6-membered heterocyclic ring" embraces heterocyclic rings having at least one nitrogen atom to which the ring is linked to the 3-position of the 2,3-dihydro-4(1H)-quinazolinone nucleus, for example, piperidino, pyrrolidino, morpholino, piperazino and the like, and including lower alkyl substituted derivatives thereof, for example, 3-methylmorpholino, 4-methylpiperazino, 2-methylpiperidino and the like; and the terms "lower alkyl" and "lower alkoxy" embrace straight and branched chain alkyl and alkoxy groups having 1 to 6 carbon atoms.

The tangible embodiments of this invention possess the inherent general physical properties of being white crystalline solids. These properties, taken together with elemental analyses, spectral data, the nature of the starting materials and the mode of synthesis positively confirm the structure of the compounds sought to be patented.

The tangible embodiments of this invention, in its final product composition aspect, possess the inherent applied use characteristics of possessing antipyretic, central nervous system depressant, and hypotensive activity as determined by recognized and accepted pharmacological test procedures.

The tangible embodiments of this invention, in its intermediate composition aspects, possess the inherent applied use characteristics of being valuable chemical intermediates in the preparation of the tangible embodiments of this invention in its final product composition aspect by the reaction sequence to be described in detail hereinafter.

The manner and process of making and using the invention will now be described so as to enable a person skilled in the art of chemistry to make and use the same as follows:

The preparation of the tangible embodiments of this invention, in its intermediate and final product composition aspects, is illustrated by the following reaction sequence.

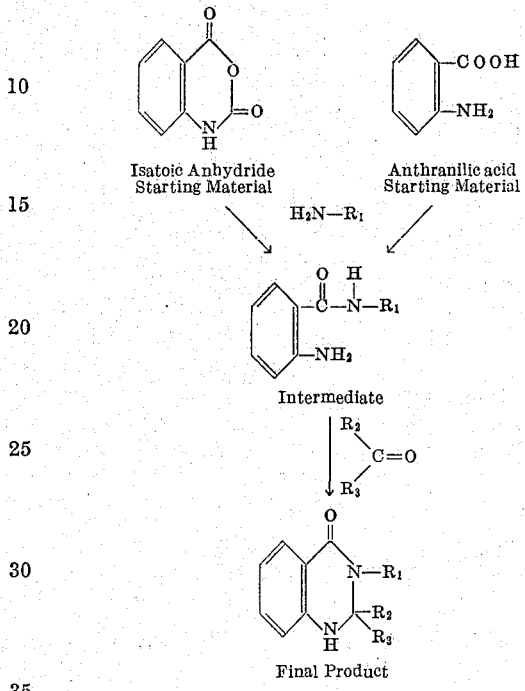

wherein $R_1$, $R_2$ and $R_3$ are as described hereinabove.

The above-identified starting materials are well-known compounds which are available commercially.

Anthranilic acid starting materials wherein the benzene ring is substituted by 1 to 3 halogen, lower alkoxy or lower alkyl groups (prepared, for example, as described in U.S. Patent 2,910,488) are the full equivalent of anthranilic acid in the foregoing reaction sequence, thereby to produce nuclearly substituted anthranilamide intermediates and 2,3-dihydro-4(1H)-quinazolinone final products having the same utility as the compounds specifically shown hereinabove. Moreover, aldehydes or ketones of the formula

wherein $R_3$ is a N,N-di-lower alkylanilino group are the full equivalent of ketones wherein $R_3$ is anilino in the above reaction sequence, thereby to produce substituted final products having the same utility as compounds wherein $R_3$ is anilino.

In the reaction sequence depicted herinabove the isatoic anhydride or anthranilic acid starting material is treated with an appropriate hydrazine of the formula $H_2N—R_1$ wherein $R_1$ is a 5- to 6-membered heterocyclic ring at reflux temperature in a solvent, non-reactive with respect to the starting material, such as, for example, dioxane, dimethyl formamide, tetrahydrofuran and the like, to form the corresponding substituted anthranilamide which constitutes intermediate composition aspect of the invention.

The intermediate thus formed is then treated with an appropriate aldehyde or ketone in the presence of a non-reactive solvent such as, for example, methanol. Where the aldehyde or ketone itself may serve as the solvent, however, no other solvent is required. This reaction is carried out at about reflux temperature and the crystalline product is recovered by conventional procedures.

In some instances as, for example, where the ketone is acetone or acetophenone, it may be necessary to employ a catalyst to effect ring closure of the anthranilic acid. Among the suitable catalysts are p-toluenesulfonic acid and hydrochloric acid.

The tangible embodiments of this invention, in its final product composition aspect, may, if desired, be converted into their non-oxic pharmaceutically acceptable acid addition salts by conventional procedures. Typical acid addition salts include the hydrochloride, hydrobromide, citrate, maleate, sulfate, nitrate and the like. Such salts are the full equivalent of the free bases and are included within the scope of this invention.

The tangible embodiments of this invention, either as the free base or in the form of a non-toxic pharmaceutically acceptable acid addition salt, may be combined with conventional pharmaceutical diluents and carriers, to form such dosage forms as tablets, capsules, solutions, suspensions, suppositories and the like.

The best mode contemplated by the inventor of carrying out this invention will now be set forth as follows:

*Example 1.—N-anthranilamidopiperidine*

Isatoic anhydride (81.6 g., 0.5 mole) and N-aminopiperidine (50.0 g., 0.5 mole) are suspended in 350 ml. of dioxane and refluxed for three hours with stirring. The crystalline solids formed are collected, washed, partially dried and then recrystallized from methanol. Yield is 74 g. (68%) of white crystalline product, M.P. 165–167° C.

*Analysis.*—Calculated for $C_{12}H_{17}ON_3$: C, 65.72%; H, 7.81%; N, 19.61%. Found C, 65.38%; H, 7.61%; N, 19.09%.

*Example 2.—3-piperidino-2,2-dimethyl-2,3-dihydro-4(1H)-quinazolinone*

N-anthranilamidopiperidine (10.4 g., 0.05 mole), formed as described in Example 1, is dissolved in 150 ml. of acetone. A trace of p-toluene sulfonic acid is added and the mixture is refluxed for 6 hours. The mixture is then concentrated and the solids collected. The solids are partially dried, washed with ether and then dissolved in chloroform. The chloroform solution is washed with saturated sodium carbonate solution, dried over anhydrous magnesium sulfate and then concentrated. Yield is 9.6 g. (74%) of white crystalline product, M.P. 184–186° C.

*Analysis.*—Calculated for $C_{15}H_{21}ON_3$: C, 69.46%; H, 8.16%; N, 16.21%. Found: C, 69.46%; H, 8.22%; N, 16.02%.

The following examples illustrate the preparation of other tangible embodiments of this invention:

*Example 3.—3-piperidino-2-phenyl-2,3-dihydro-4(1H)-quinazolinone*

N-anthranilamidopiperidine (10.4 g., 0.05 mole), formed as described in Example 1, and benzaldehyde (6 ml., 0.055 mole) is dissolved in 100 ml. of methanol and refluxed for 5 hours. It is then concentrated and the solid is collected, partially dried and recrystallized from absolute ethanol to yield 17.9 g. (78%) of white crystalline product, M.P. 146–148° C.

*Analysis.*—Calculated for $C_{19}H_{21}ON_3$: C, 74.24%; H, 6.89%; N, 13.67%. Found: C, 74.41%; H, 6.66%; N, 13.62%.

*Example 4.—N-anthranilamidomorpholine*

Isatoic anhydride (308 g., 1.892 mole) and N-aminomorpholine (192.8 g., 1.892 mole) are suspended in 1400 ml. of dioxane. The mixture is refluxed for three hours with stirring. The solids are collected, washed with acetone, partially dried, decolorized with charcoal and then recrystallized from methanol to yield 270 g. (65%) of white crystalline product, M.P. 204–205° C.

*Analysis.*—Calculated for $C_{11}H_{15}O_2N_3$: C, 59.71%; H, 6.83%; N, 18.99%. Found: C, 60.30%; H, 6.90%; N, 18.74%.

*Example 5.—3-morpholino-2-methyl-2,3-dihydro-4(1H)-quinazolinone*

N-anthranilamidomorpholine (11.0 g., 0.05 mole), prepared as described in Example 4, and acetaldehyde (2.5 g., 0.055 mole) are dissolved in 100 ml. of methanol and the mixture is heated on the steam bath for 30 minutes. The resulting product is recovered by concentrating the methanol, is collected, dried and recrystallized from absolute ethanol to yield 12 g. (97%) of white crystalline product, M.P. 193–195° C.

*Analysis.*—Calculated for $C_{13}H_{17}O_2N_3$: C, 63.15%; H, 6.93%; N, 16.97. Found: C, 62.94%; H, 6.80%; N, 16.73%.

*Example 6.—3-morpholino-2,2-dimethyl-2,3-dihydro-4(1H)-quinazolinone*

N-anthranilamidomorpholine (27.9 g., 0.126 mole), prepared as described in Example 4, is dissolved in 150 ml. of acetone and p-toluenesulfonic acid (1 g.) is added as a catalyst. The solution is refluxed on a steam bath overnight and then concentrated. The collected solids are partially dried, washed with ether and then dissolved in chloroform. The chloroform solution is washed with saturated sodium carbonate solution, dried over anhydrous magnesium sulfate and then concentrated to yield 23 g. (70%) of white crystalline product, M.P. 257–259° C.

*Analysis.*—Calculated for $C_{14}H_{19}O_2N_3$: C, 64.34%; H, 7.33%; N, 16.08%. Found: C, 64.18%; H, 7.17%; N, 15.99%.

*Example 7.—3-morpholino-2-phenyl-2,3-dihydro-4(1H)-quinazolinone*

N-anthanilamidomorpholine (22.1 g., 0.1 mole), prepared as described in Example 4, and benzaldehyde (12.0 g., 0.11 mole) are dissolved in 100 ml. of methanol and the reaction carried out as described in Example 5 to yield 29.2 g. (94%) of white crystalline product, M.P. 223–225° C.

*Analysis.*—Calculated for $C_{18}H_{19}O_2N_3$: C, 69.88%; H, 6.19%; N, 13.58%. Found: C, 69.57%; H, 6.09%; N, 13.49%.

*Example 8.—3-morpholino-2-methyl-2-phenyl-2,3-dihydro-4(1H)-quinazolinone*

N-anthranilamidomorpholine (22.1 g., 0.1 mole), prepared as described in Example 4, and acetophenone (12.02 g., 0.1 mole) are dissolved in 200 ml. methanol containing sufficient hydrochloric acid to give a pH of 4 to 5. The solution is refluxed several hours and then concentrated to dryness. Water (200 ml.) is added and the solution neutralized to slightly basic with 5% sodium hydroxide and then chilled and the solid collected. The yield after recrystallization is 27.2 g. (84%) of white crystalline solid.

*Analysis.*—Calculated for $C_{19}H_{21}O_2N_3$: C, 70.56%: H, 6.55%; N, 13.00%. Found: C, 70.07%; H, 6.73%; N, 13.34%.

*Example 9.—3-morpholino-2-(p-N,N-dimethylanilino)-2,3-dihydro-4(1H)-quinazolinone*

N-anthranilamidomorpholine (11.05 g., 0.05 mole), prepared as described in Example 4, and p-dimethylaminobenzaldehyde (7.45 g., 0.055 mole) are dissolved in 100 ml. of methanol and the reaction carried out as described in Example 5 to yield 16.4 g. (94%) of white crystalline product, M.P. 225–227° C.

*Analysis.*—Calculated for $C_{20}H_{24}O_2N_4$: C, 68.16%; H, 6.86%; N, 15.90%. Found: C, 67.79%; H, 6.67%; N, 15.76%.

*Example 10.—3-morpholino-2-(3,4-methylenedioxyphenyl)-2,3-dihydro-4(1H)-quinazolinone*

N-anthranilamidomorpholine (22.8 g., 0.1 mole), prepared as described in Example 4, and piperonal (15.0 g., 0.1 mole) are dissolved in 200 ml. of methanol and the reaction carried out as described in Example 5 to yield 31.6 g. (90%) of white crystalline product, M.P. 192–194° C.

*Analysis.*—Calculated for $C_{19}H_{19}O_4N_3$: C, 64.58%; H, 5.42%; N, 11.89%. Found: C, 64.62%; H, 5.51%; N, 11.81%.

*Example 11.—N-anthranilamido(4-methylpiperazine)*

Isatoic anhydride (81.6 g., 0.5 mole) and 1-amino-4-methyl-piperazine (57.5 g., 0.5 mole) are suspended in 350 ml. of dioxane and the reaction carried out as described in Example 4 to yield 48 g. (41%) of white crystalline product, M.P. 188–189° C.

*Analysis.*—Calculated for $C_{12}H_{18}ON_4$: C, 61.51%; H, 7.74%. Found: C, 61.54%; H, 7.89%.

*Example 12.—3-(4-methylpiperazino)-2-phenyl-2,3-dihydro-4(1H)-quinazolinone*

N-anthranilamido(4-methylpiperazine) (17.1 g., 0.073 mole), prepared as described in Example 11, and benzaldehyde (8.0 g., 0.073 mole) are dissolved in 225 ml. of methanol and the reaction carried out as described in Example 5 to yield 13.1 g. (81%) white crystalline product, M.P. 221–223° C.

*Analysis.*—Calculated for $C_{19}H_{22}ON_4$: C, 70.78%; H, 6.88%; N, 17.38%. Found: C, 70.43%; H, 6.80%; N, 16.99%.

The subject matter which the applicant regards as his invention is particularly pointed out and distinctly claimed as follows.

I claim:
1. A compound of the formula

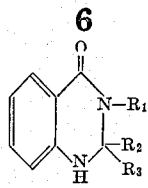

wherein $R_1$ is a member selected from the group consisting of piperidino, pyrrolidino, morpholino, piperazino and lower alkyl substituted derivatives thereof, $R_2$ is a member selected from the group consisting of hydrogen and lower alkyl and $R_3$ is a member selected from the group consisting of lower alkyl, phenyl, 3,4-methylenedioxyphenyl and anilino.

2. 3-piperidino - 2,2 - dimethyl - 2,3-dihydro--4(1H)-quinazolinone.
3. 3-piperidino-2-phenyl-2,3-dihydro - 4(1H)-quinazolinone.
4. 3-morpholino-2-methyl - 2,3 - dihydro-4(1H)-quinazolinone.
5. 3 - morpholino - 2,2 - dimethyl-2,3-dihydro-4(1H)-quinazolinone.
6. 3-morpholino-2-phenyl - 2,3 - dihydro-4(1H)-quinazolinone.
7. 3 - morpholino - 2 - methyl-2-phenyl-2,3-dihydro-4(1H)-quinazolinone.
8. 3 - morpholino - 2 - (p-N,N-dimethylanilino)-2,3-dihydro-4(1H)-quinazolinone.
9. 3-morpholino - 2 - (3,4-methylenedioxyphenyl)-2,3-dihydro-4(1H)-quinazolinone.
10. 3-(4-methylpiperazino) - 2 - phenyl-2,3-dihydro-4(1H)-quinazolinone.

References Cited by the Examiner
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,425,320 | 8/1947 | Hill | 252—149 |
| 2,606,155 | 8/1952 | Hill | 252—149 |

HENRY R. JILES, *Acting Primary Examiner.*

JOSE TOVAR, *Assistant Examiner.*